United States Patent
Eliu et al.

(10) Patent No.: US 7,307,155 B2
(45) Date of Patent: Dec. 11, 2007

(54) CATIONIC DIRECT DYES

(75) Inventors: Victor Paul Eliu, Lörrach (DE); Beate Fröhling, Steinen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/565,137

(22) PCT Filed: Jul. 14, 2004

(86) PCT No.: PCT/EP2004/051481

§ 371 (c)(1),
(2), (4) Date: Jan. 19, 2006

(87) PCT Pub. No.: WO2005/012437

PCT Pub. Date: Feb. 10, 2005

(65) Prior Publication Data

US 2006/0179586 A1 Aug. 17, 2006

(30) Foreign Application Priority Data

Jul. 24, 2003 (EP) .................................. 03102286

(51) Int. Cl.
*C09B 44/16* (2006.01)
*A61Q 5/10* (2006.01)
(52) U.S. Cl. .................. 534/607; 534/608; 8/405; 8/406; 8/407; 8/426; 8/657
(58) Field of Classification Search ................ 534/607, 534/608; 8/405–407, 426, 657
See application file for complete search history.

(56) References Cited

U.S. PATENT DOCUMENTS

| | | | | |
|---|---|---|---|---|
| 3,102,879 A | * | 9/1963 | Baumann et al. ........... 534/607 |
| 3,173,907 A | | 3/1965 | Klingsberg et al. ......... 260/157 |
| 3,216,995 A | * | 11/1965 | Baumann et al. ........... 534/588 |
| 4,067,973 A | | 1/1978 | Budde et al. ................ 424/226 |
| 4,079,130 A | | 3/1978 | Abdallah et al. ........... 424/226 |
| 4,294,756 A | | 10/1981 | Kühlthau .................... 260/163 |
| 5,708,151 A | | 1/1998 | Möckli ........................ 534/608 |

FOREIGN PATENT DOCUMENTS

| | | |
|---|---|---|
| DE | 1 098 642 | 2/1961 |
| DE | 1 137 815 | 10/1962 |
| DE | 1 137 816 | 10/1962 |
| EP | 1 166 752 | 1/2002 |
| EP | 1 219 683 | 7/2002 |
| GB | 885 046 | 12/1961 |
| GB | 2 029 439 | 3/1980 |
| GB | 2 032 447 | 5/1980 |
| JP | 56-53658 | * 5/1981 |

OTHER PUBLICATIONS

English language abstract for EP 1 166 752 printed from esp@cenet. com on Jul. 13, 2006.
Von H. Baumann et al., Chimia vol. 15, pp. 163-168 (Jan. 1961).

* cited by examiner

*Primary Examiner*—Fiona T Powers
(74) *Attorney, Agent, or Firm*—Mervin G. Wood

(57) ABSTRACT

The present invention relates to novel the cationic dyes of formula (1) wherein $R_1$ is an unsubstituted or substituted $C_1$-$C_{14}$ alkyl or an aryl radical; $X^-$ is an anion; $R_3$ is an unsubstituted or substituted $C_1$-$C_{14}$ alkyl, aryl radical, $C_1$-$C_6$ alkoxy, cyanid, nitro or halide; n is 1 or 2; and if n is 1, then $R_2$ is hydrogen, unsubstituted or substituted $C_1$-$C_{14}$ alkyl; or if n is 2, then $R_2$ is an unsubstituted or substituted $C_1$-$C_{14}$ alkylen. Further, the present invention relates to compositions thereof, especially comprising other dyes, to processes for the preparation thereof and to the use thereof in the dyeing of organic material, such as keratin, wool, leather, silk, paper, cellulose or polyamides, and preferably human hair

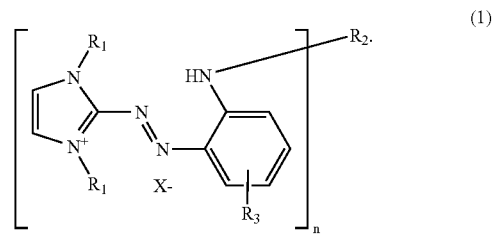

(1)

14 Claims, No Drawings

CATIONIC DIRECT DYES

The present invention relates to novel cationic direct dyes, compositions thereof, to processes for their preparation and to their use in the dyeing of organic material, such as keratin fibers, wool, leather, silk, paper, cellulose or polyamides, especially keratin-containing fibers, cotton or nylon, and preferably hair, more preferably human hair.

It is known, for example, from WO 95/01772 that cationic dyes can be used to dye organic material, for example keratin, silk, cellulose or cellulose derivatives, and also synthetic fibers, for example polyamides. Cationic dyes exhibit very brilliant shades. A disadvantage is their unsatisfactory fastness to hydrolysis and to light, their frequently inadequate stability under reducing or oxidizing conditions, and their frequently unsatisfactory storage stability (see: John F. Corbett: "The Chemistry of Hair-Care Products", JSCD August, 1976, page 290).

The actual technical problem of the present invention was to provide brilliant dyes that are distinguished by deep dying having good fastness properties with respect to washing, light, shampooing and rubbing, and that preferably exhibit satisfactory stability under reducing or oxidizing dyeing conditions, for the dyeing of organic material.

Accordingly, the cationic dye of formula (1)

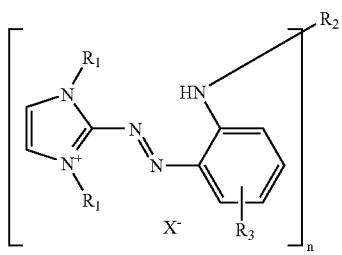

has been discovered, wherein $R_1$ is an unsubstituted or substituted $C_1$-$C_{14}$alkyl or an aryl radical;

$X^-$ is an anion;

$R_3$ is an unsubstituted or substituted $C_1$-$C_{14}$alkyl, aryl radical, $C_1$-$C_6$alkoxy, cyanid, nitro or halide;

n is 1 or 2; and if n is 1, then $R_2$ is hydrogen, unsubstituted or substituted $C_1$-$C_{14}$alkyl; or if n is 2, then $R_2$ is unsubstituted or substituted $C_1$-$C_{14}$alkylen.

Preferred is a cationic dye of formula (1), wherein $R_1$ is methyl.

In addition, more preferred is a cationic dye of formula (1), wherein $R_1$ is methyl, n is 1, and $R_2$ is a substituted or unsubstituted $C_1$-$C_{12}$alkyl.

Further, more preferred is a cationic dye of formula (1), wherein $R_1$ is methyl, n is 2, and $R_2$ is a substituted or unsubstituted $C_1$-$C_{14}$alkylen, preferred is a substituted or unsubstituted $C_1$-$C_8$alkylen, and more preferred is a substituted or unsubstituted $C_1$-$C_6$alkylen.

Much more preferred is a cationic dye of formula (1), wherein $R_3$ is hydrogen and $R_1$ is methyl, n is 1, and $R_2$ is an unsubstituted or substituted $C_1$-$C_{12}$alkyl.

Further, much more preferred is a cationic dye of formula (1), wherein

R3 is hydrogen and $R_1$ is methyl, n is 2, and $R_2$ is a substituted or unsubstituted $C_1$-$C_{14}$alkylen, preferred is a substituted or unsubstituted $C_1$-$C_8$alkylen, and more preferred is a substituted or unsubstituted $C_1$-$C_6$alkylen.

In the present invention, substituents of $C_1$-$C_{14}$alkyl or $C_1$-$C_{14}$alkylen, $C_1$-$C_{12}$alkyl or $C_1$-$C_{12}$alkylen, $C_1$-$C_8$alkyl and $C_1$-$C_8$alkylen, and preferably $C_1$-$C_6$alkyl and $C_1$-$C_6$alkylen are, for example hydroxyl; $C_1$-$C_8$alkyl, preferably methyl; or $C_1$-$C_8$alkoxy and $C_1$-$C_6$alkoxy; cyanide and/or halide; or $NR_5R_6$, wherein $R_5$ and $R_6$ are each independently of the other hydrogen, unsubstituted or substituted aryl radical or $C_1$-$C_6$alkyl, preferably methyl, ethyl, propyl, isopropyl or t-butyl.

$C_1$-$C_{14}$alkyl and $C_1$-$C_{14}$alkylen, $C_1$-$C_{12}$alkyl or $C_1$-$C_{12}$alkylen, $C_1$-$C_8$alkyl and $C_1$-$C_8$alkylen, and preferably $C_1$-$C_6$alkyl and $C_1$-$C_6$alkylen; and may be straight-chain or branched, preferably branched alkyl or alkylen are tert.-butyl, isopropyl, dodecyl, 2,2-dimethylpropyl, or 2,2-dimethylpropylen; or preferably straight-chain alkyl or alkylen are ethyl, dodecyl, hexyl, ethylene, dodecylen, hexylen, octyl, octylen; or from $C_5$alkyl or $C_5$alkylen upwards, monocyclic or polycyclic, and preferably cyclohexyl or cylohexylen;

and may be uninterrupted or interrupted by at least one hetero atom, such as O, S, N, NH; for example —$CH_2CH_2$—O—$CH_2CH_2$—O—$CH_2CH_3$, or —$CH_2CH_2$—O—$CH_2CH_3$, or —$CH_2CH_2$—O—$CH_3$, or —$CH_2$—$O$—$CH_3$, or $CH_2CH_2CH_2$—O—$CH(CH_3)_2$, preferably $CH_2CH_2CH_2$—O—$CH(CH_3)_2$.

$C_1$-$C_{14}$alkyl and $C_1$-$C_{14}$alkylen, is $C_1$-$C_{12}$alkyl or $C_1$-$C_{12}$alkylen, $C_1$-$C_8$alkyl and $C_1$-$C_8$alkylen, and preferably $C_1$-$C_6$alkyl and $C_1$-$C_6$alkylen; and preferred is $C_1$-$C_{14}$alkyl is $C_1$-$C_{12}$alkyl, and $C_1$-$C_{14}$alkylen is preferred $C_1$-$C_6$alkylen.

$C_1$-$C_{14}$alkyl is, for example, methyl, ethyl, propyl, isopropyl, n-butyl, sec-butyl, tert-butyl, n-pentyl, 2-pentyl, 3-pentyl, 2,2'-dimethylpropyl, cyclopentyl, cyclohexyl, n-hexyl, n-octyl, 1,1',3,3'-tetramethylbutyl, 2-ethylhexyl, nonyl, decyl, undecyl or dodecyl.

$C_1$-$C_{12}$alkyl is, for example, methyl, ethyl, propyl, isopropyl, n-butyl, sec-butyl, tert-butyl, n-pentyl, 2-pentyl, 3-pentyl, 2,2'-dimethylpropyl, cyclopentyl, cyclohexyl, n-hexyl, n-octyl, 1,1',3,3'-tetramethylbutyl, 2-ethylhexyl, nonyl, decyl, undecyl or dodecyl.

$C_1$-$C_8$alkyl is, for example, methyl, ethyl, propyl, isopropyl, n-butyl, sec-butyl, tert-butyl, n-pentyl, 2-pentyl, 3-pentyl, 2,2'-dimethylpropyl, cyclopentyl, cyclohexyl, n-hexyl, n-octyl, 1,1',3,3'-tetramethylbutyl or 2-ethylhexyl.

$C_1$-$C_6$alkyl is, for example, methyl, ethyl, propyl, isopropyl, n-butyl, sec-butyl, tert-butyl, n-pentyl, 2-pentyl, 3-pentyl, 2,2'-dimethylpropyl, cyclopentyl, cyclohexyl, n-hexyl.

$C_1$-$C_4$alkyl is, for example, methyl, ethyl, propyl, isopropyl, n-butyl, sec-butyl or tert-butyl.

Preferred is methyl, 2,2'-dimethylpropyl, n-hexylen $C_1$-$C_{14}$alkylen is, for example, methylen, ethylen, propylen, isopropylen, n-butylen, sec-butylen, tert-butylen, n-pentylen, 2-pentylen, 3-pentylen, 2,2'-dimethylpropylen, cyclopentylen, cyclohexylen, n-hexylen, n-octylen, 1,1',3,3'-tetramethylbutylen, 2-ethylhexylen, nonylen, decylen, undecylen or dodecylen.

$C_1$-$C_{12}$alkylen is, for example, methylen, ethylen, propylon, isopropylen, n-butylen, sec-butylen, tert-butylen, n-pentylen, 2-pentylen, 3-pentylen, 2,2'-dimethylpropylen, cyclopentylen, cyclohexylen, n-hexylen, n-octylen, 1,1',3,3'-tetramethylbutylen, 2-ethylhexylen, nonylen, decylen, undecylen or dodecylen.

$C_1$-$C_8$alkylen is, for example, methylen, ethylen, propylen, Isopropylen, n-butylen, sec-butylen, tert-butylen, n-pentylen, 2-pentylen, 3-pentylen, 2,2'-dimethylpropylen, cyclopentylen, cyclohexylen, n-hexylen, n-octylen, 1,1',3,3'-tetramethylbutylen or 2-ethylhexylen.

$C_1$-$C_6$alkylen is, for example, methylen, ethylen, propylen, isopropylon, n-butylen, sec-butylen, tert-butylen, n-pentylen, 2-pentylen, 3-pentylen, 2,2'-dimethylpropylen, cyclopentylen, cyclohexylen, n-hexylen.

$C_1$-$C_4$alkylen is, for example, methylen, ethylen, propylen, isopropylen, n-butylen, sec-butylen, tert-butylen, $C_1$-$C_6$alkoxy is O—$C_1$-$C_6$alkyl, preferably O—$C_1$-$C_4$alkyl.

Aryl radical is, for example, an unsubstituted or substituted phenyl, benzyl- or tolyl Halide is, for example, fluoride, chloride, bromide or iodide, especially chloride and fluoride.

"Anion" denotes, for example, an organic or inorganic anion, such as halide, preferably chloride and fluoride, sulfate, hydrogen sulfate, phosphate, boron tetrafluoride, carbonate, bicarbonate, oxalate or $C_1$-$C_8$alkyl sulfate, especially methyl sulfate or ethyl sulfate; anion also denotes lactate, formate, acetate, propionate or a complex anion, such as the zinc chloride double salt.

The anion is especially a halide, preferably chloride or fluoride, sulfate, hydrogen sulfate, methylsulfate, phosphate, formate, acetate or lactate.

The anion is more especially chloride, methyl sulfate, formate or acetate.

More preference is given to cationic dyes of formulae (3), (4), (5), (6), (7), (8), (9), (10), (11), (12), (13), (14), (15), (16) or (17)

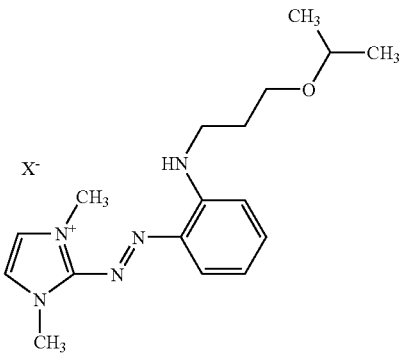
(3)

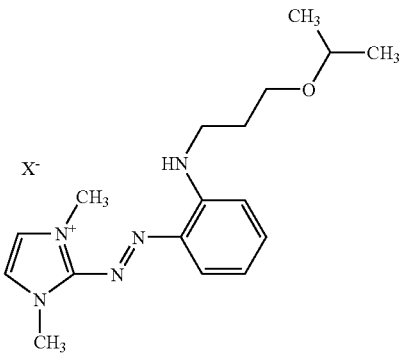
(4)

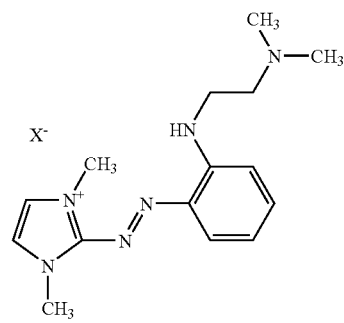
(5)

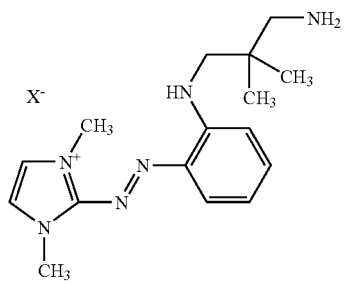
(6)

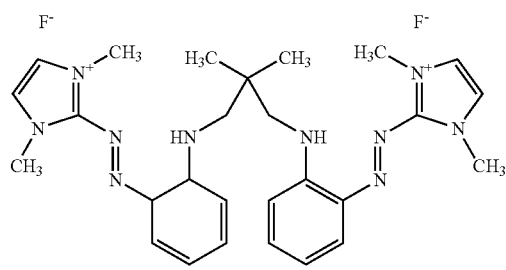
(7)

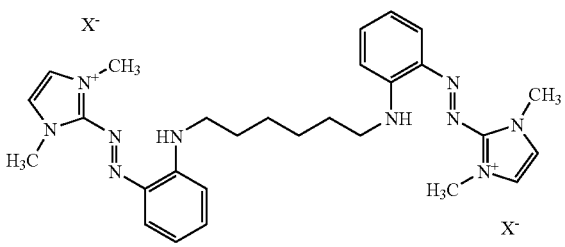
(8)

-continued
(9)
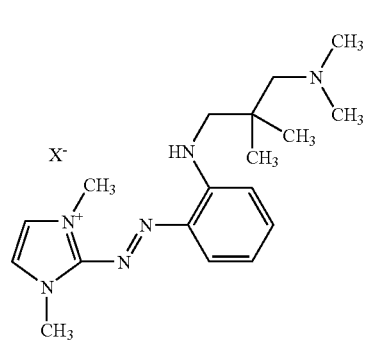
(10)
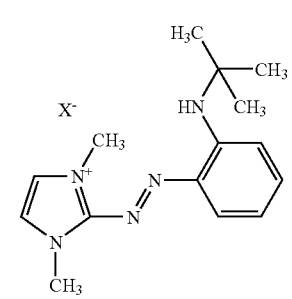
(11)
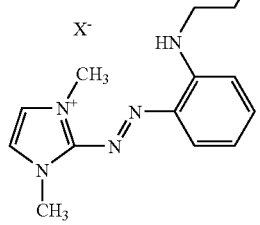
(12)
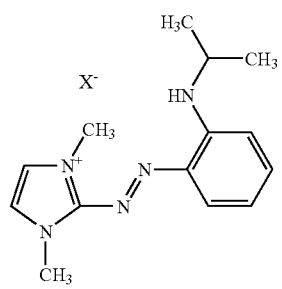
(13)
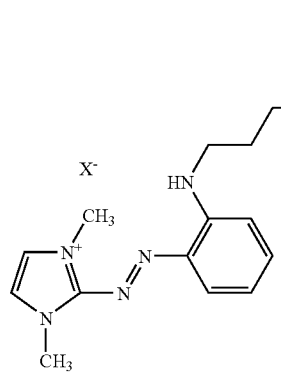
(14)
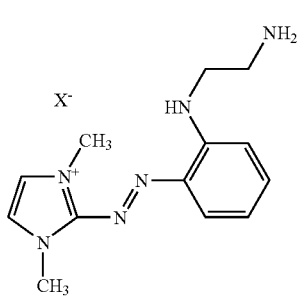
(15)
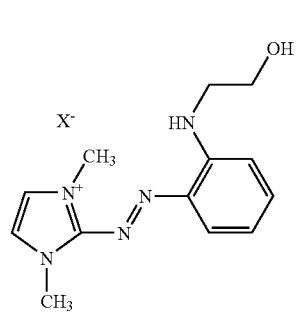
(16)
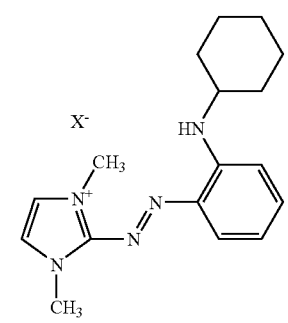
(17)
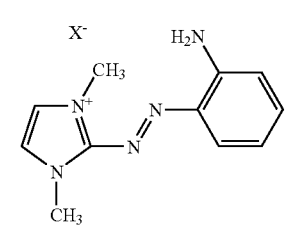

wherein

X⁻ is an anion.

Most preference is given to cationic dyes of formulae (6), (7) or (8)

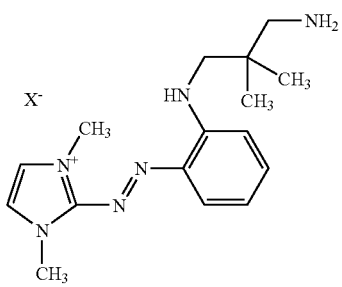
(6)

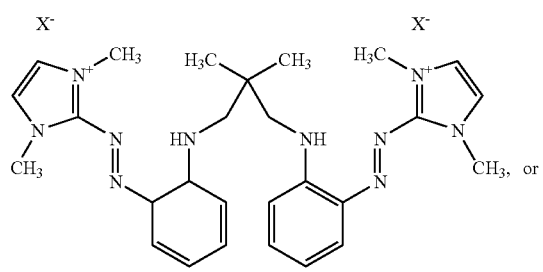
(7)

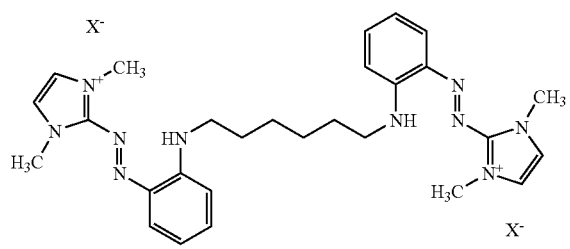
(8)

wherein

X⁻ is an anion.

The present invention concerns in addition a cationic dye of formula (18)

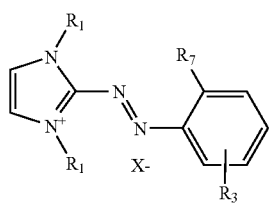
(18)

wherein $R_7$ is $C_1$-$C_6$alkoxy or halide, preferred halides are chloride or fluoride, preferred fluoride, and $R_1$, $R_3$ and X— having the same definition and preferences as given for compound of formula (1);

preferred is compound of formula (18), wherein $R_7$ is fluoride;

and more preferred is compound of formula (18), wherein $R_7$ is fluoride and $R_1$ is methyl;

and most preferred is compound of formula (18), wherein $R_7$ is fluoride, $R_1$ is methyl and $R_3$ is hydrogen.

Further, the present invention concerns a process for the preparation of cationic dyes of formula (18) as defined above, comprising a) diazotiation of a compound of the following formula

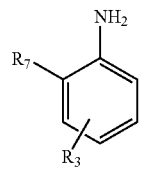

wherein $R_3$ and $R_7$ have the above given definitions and preferences, and b) coupling the diazotiated compound with Imidazole, and c) then alkylation or arylation; preferably methylating.

The present invention also concerns a dye of formula (21)

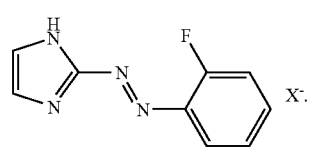
(21)

In addition, the present invention concerns a process for the preparation of cationic dyes of formula (21) as defined above, comprising a) diazotizing 2-fluoroanilin and b) then coupling with imidazole.

The above mentioned diazotation, coupling, alkylation and arylation are methods known per se, and are for example disclosed in standard textbooks, such as for example Jerry March, Advanced Organic Chemistry: Reactions, Mechanismus and Structure.

The present invention relates also to a process for the preparation of the dyes of formula (1), preferably to a dye of formula (3), (4), (5), (6), (7), (8), (9), (10), (11), (12), (13), (14), (15), (16) or (17) and comprises a) bringing a compound of formula (18)

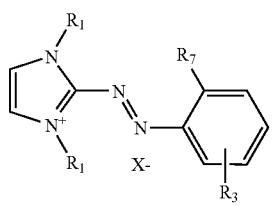
(18)

which is prepared according to the process described above, and wherein $R_7$ is $C_1$-$C_6$alkoxy or halide, preferred halides are chloride or fluoride, preferred fluoride, and $R_1$, $R_3$ and X— having the same definition and preferences as given for compound of formula (1), with an amine of formula (19)

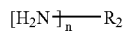 (19)

wherein n is 1 or 2; and if n is 1, then $R_2$ is hydrogen, unsubstituted or substituted $C_1$-$C_{14}$alkyl; or if n is 2, then $R_2$ is unsubstituted or substituted $C_1$-$C_{14}$alkylen; into contact.

The reaction is generally initiated by bringing the compound of formula (18) and the amine of formula (19) into contact; for example by mixing together the starting compounds or by drop wise addition of one starting compound to the other.

Customary, the temperature is in the range of 290 to 300 K during the mixing of the starting compounds.

The molar ratio of compound of formula (18) to amine of formula (19) is generally selected in the range from 5:1 to 1:5, especially in the range from 3:1 to 1:3.

The duration of reaction is generally dependent on the reactivity of the starting compounds, on the reaction temperature chosen and on the desired conversion. The chosen duration of reaction is usually in the range from one hour to three days.

The reaction temperature for the reaction of the compound of formula (18) with the amine of formula (19) is advisable to select in the range from 293 to 363 K, especially in the range from 323 to 355K, more especially in the range from 333 to 355 K.

The reaction pressure chosen is generally in the range from 70 kPa to 10 MPa, especially from 90 kPa to 5 MPa, and is more especially atmospheric pressure.

It may by desirable to conduct the reaction of compound of formula (18) and amine of formula (19) in the presence of a base.

The molar ratio of compound of formula (18) to the base is generally selected in the range from 10:1 to 1:5, especially in the range from 1:1 to 1:3.

Suitable bases are for example an alkali metal hydroxide, such as sodium-, potassium or lithium hydroxide, such as sodium hydroxide, or an alkali metal carbonate, such as sodium-, potassium or lithium carbonate, such as sodium carbonate, or an alkali metal hydrocarbonate, such as sodium-, potassium or lithium hydrocarbonate, such as sodium hydrocarbonate, or an alkali metal $C_1$-$C_6$alkyloxide, such as sodium-, potassium or lithium $C_1$-$C_6$alkyloxide, preferably sodium methoxide, potassium methoxide or lithium methoxide, or sodium ethoxide, potassium ethoxide or lithium ethoxide; or tertiary amines, for example, such as pyridine, trimethylamine, triethylamine, trioctyllamine, 1,4-diazabicyclo[2.2.2]octan, chinuclidine, N-methylpiperidine; or alkalimetal acetate, for example such as sodium acetate, potassium acetate, or lithium acetate.

Preferred are sodium hdroxide, sodium carbonate, tertiary amines, such as pyridine and 1,4-diazabicyclo[2.2.2]octan.

It may by desirable to conduct the reaction of compound of formula (18) and amine of formula (19) in the presence of a catalyst.

The molar ratio of compound of formula (18) to the catalyst is generally selected in the range from 100:0.01 to 100:10, especially in the range from 100:1 to 100:10, most preferred in the range of 100:4 to 100 to 6.

Suitable catalysts are for example an alkali metal $C_1$-$C_6$alkyloxide, such as sodium-, potassium or lithium $C_1$-$C_6$alkyloxide, preferably sodium methoxide, potassium methoxide or lithium methoxide, or sodium ethoxide, potassium ethoxide or lithium ethoxide; or tertiary amines, for example, such as pyridine, trimethylamine, triethylamine, trioctyllamine, 1,4-diazabicyclo[2.2.2]octan, chinuclidine, N-methylpiperidine; or alkalimetal acetate, for example such as sodium acetate, potassium acetate, or lithium acetate.

Preferred are potassium acetate, sodium methoxide, pyridine and 1,4diaza-bicyclo[2.2.2]octan.

It is recommended that the reaction mixture obtained be subsequently stirred in the selected temperature range from 293 to 363 K, especially in the range from 323 to 355 K, more especially in the range from 333 to 355 K. The duration chosen for the subsequent stirring is generally from 1 hour to 24 hours.

In addition, the reaction can be carried out with or without solvent, but is preferably carried out in a solvent. Preference is given to organic solvents or solvent mixtures.

Within the context of this invention, solvents are organic solvents and water, or a mixture of organic solvents or a mixture of organic solvents and water.

Organic solvents are, for example, protic or aprotic polare organic solvents, such as alcohols, for example methanol, ethanol, n-propanol, isopropanol, butanol or glycols, especially isopropanol, or nitrile, such as acetonitrile or propionitrile, or amide, such as dimethylformamide, dimethylacetamide or N-methylpyridine, or sulfoxide, such as dimethylsulfoxide, or mixtures thereof.

The ratio by weight of compound of formula (18) to the solvent is generally in the range from 20 to 90% by weight, especially in the range from 30 to 60% by weight.

The prepared product may be advantageously worked up and isolated, and if desired be purified.

Customary, the work up starts by decreasing the temperature of the reaction mixture in the range from 280 to 300 K, especially in the range from 290 to 300 K.

It may be of advantageous to decrease the temperature slowly, over a period of several hours.

In general, the reaction product is usually filtered and then washed with water or a salt solution and subsequently dried.

Filtration is normally carried out in standard filtering equipment, for example Büchner funnels, filter presses, pressurised suction filters, preferably in vacuo.

The temperature for the drying is dependent on the pressure applied. Drying is usually carried out in vacuo at 60-200 mbar.

The drying is usually carried out at a temperature in the range from 313 to 363 K, especially from 323 to 353 K, and more especially in the range from 328 to 348 K.

It has proved advantageous for the product to be purified by recrystalilsation after it has been isolated.

Organic solvents and solvent mixtures are suitable for the recrystallisation. Preference is given to alcohols, for example methanol, ethanol, 2-propanol or butanol, especially 2-propanol.

The dyes of formula (1) according to the invention are suitable for dyeing organic material, such as keratin, wool, leather, silk, paper, cellulose or polyamides, especially keratin-containing fibers, cotton or nylon, and preferably human hair.

The multiplicity of shades of the dye, which results by the method according to the present invention, can be increased by combination with other dyes.

The present invention relates also to the coloration of hair with a dye of formula (1) according to the present invention, and at least a single further dye.

The dye of formula (1) of the present invention can be combined with dyes of the same or different class of dyes, especially with direct dyes, oxidation dyes; dye precursor combinations of a coupler compound and a diazotized compound, or a capped diazotized compound; and/or cationic reactive dyes.

Direct dyes are natural or synthetic; they are uncharged, cationic or anionic, such as acid dyes.

Oxidation dye denotes also for oxidation dye precursors, which are from the group of the developer and coupler compounds. Wherein the coupler compounds denotes also to the addition salts thereof with an acid.

In the context of the present invention the single classes of dyes comprise the dyes defined In the Color Index of the Society of Textile Chemist and Colorist.

Further, in the context of the present invention, combinations comprising of a compound of formula (1) are compositions, formulation, methods and.

The present invention further comprises compositions, formulation, methods or combinations comprising of a compound of formula (1).

Preferred for a combination with a cationic dye of formula (1) are cationic dyes, such as Basic Yellow 87, Basic Orange 31 or Basic Red 51, or cationic dyes as described in WO 01/66646, especially cationic dye of example 4, or cationic dyes as described in WO 02/31056, especially cationic dye of example 6, compound of formula 106 dye of formula (3) as described in EP-A-714,954.

In the present invention preferred does a composition comprise a compound of formula (1) and in addition at least a single further direct dye and/or an oxidative agent.

Further, in the present invention preferred does a composition comprise a compound of formula (1) and in addition at least a single oxidative dye and/or; at least a single oxidative dye and an oxidative agent.

In addition, in the present invention preferred is a composition comprising a compound of formula (1) in form of a shampoo, conditioner, gel or emulsion.

Further, in the present invention preferred 18 a method of dyeing organic material, especially human hair, that comprises bringing into contact with the organic material at least a single a cationic dye of formula (1).

More preferred is in the present invention a method for dyeing or tinting human hair.

A further preferred embodiment of the present invention concerns a method for dyeing human hair or strands, that comprises contacting the hair with at least a single a cationic dye of formula (1) and an oxidative agent and, optionally, a further direct dye.

In addition, the present invention concerns a method for dyeing human hair according to any of claims 12 to 14, that comprises contacting the hair with at least a single a cationic dye of formula (1) and at least a single oxidative dye; or contacting the hair with a cationic dye of formula (1) and at least a single oxidative dye and an oxidative agent The dyes according to the invention are distinguished by brilliant shades. They are suitable for dyeing organic material, such as keratin, wool, leather, silk, paper, cellulose or polyamides, especially keratin-containing fibers, cotton or nylon, and preferably human hair. The dyeing obtained is distinguished by their depth of shade and their good fastness to washing properties, such as, for example, fastness to light, shampooing and rubbing. The stability and storage stability of the dyes according to the invention are excellent. They are accordingly especially suitable for dyeing under oxidizing and reducing conditions. The advantage of the new dyes according to the present invention, especially those of formula (4), (5), or (6), is their stability against reduction agents e. g. sodium sulfite and ascorbic acid. Therefore, they can be combined with oxidation dyes in one emulsion.

The following Examples serve to illustrate the processes for coloration without limiting the processes thereto. Unless specified otherwise, parts and percentages relate to weight. The amounts of dye specified are relative to the material being colored.

EXAMPLES A

Process of Preparation

EXAMPLE A1

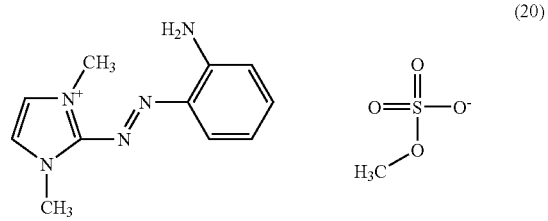

(20)

12.4 g 2-Fluoroanilin is added to a stirred solution of 25 ml water and 25 ml of 32% hydrochloric acid at 295 K. Then, the reaction mixture is cooled to 273 K and 19 ml 36% sodium nitrite solution is dropped at such a rate that the temperature of the mixture is maintained in the range of 273 to 276 K. After the addition of the sodium nitrite solution, the mixture is stirred for one hour. If no excess of nitrite is detected during one hour (detection by using a potassium iodide/starch paper), further amounts of sodium nitrite solution is added. After this one hour the remaining excess of nitrite is destroyed with sulfamic acid. Then, the obtained diazo solution is dropped to a 273 K cold solution of 7.4 g imidazole in 30 ml water, whereby the pH of the solution is maintained in the range of pH 10 to 11 by adding 36% sodium hydroxide solution. After completing the diazo addition, the obtained suspension is warmed up to 295 K, the pH is adjusted to 10.5 with 36% sodium hydroxide solution. After one hour stirring at this pH and temperature, the suspension is filtrated. Then, the obtained filtercake is washed twice with 50 ml water to obtain 55 g of the humid product. Then, the humid product is suspended in 500 ml water and 0.3 mole dimethylsulphate and sodium hydroxide added simountaniously for maintaining the pH at 10-10.3 and the temperature at 25 to 30° C. The mixture is hold for one hour, to finish the hydrolysis of excess of dimethylsulphate. The the water is evaporated and about 40 g humid solid obtained, which gives 27 g dryed (0.07 mole) product with the following formula:

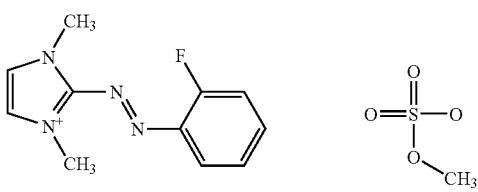

(21)

1 g sodium methoxide is added under nitrogen atmosphere, at 293 K, to a stirred mixture of 10.0 ml of a 25% ammoniac solution, 100 g isopropanol, to the compound of formula (21). Then, the temperature is raised to 333 K. The reaction mixture is stirred 28 hour at this temperature under the autoclave pressure. Then, the reaction mass is stirred for 4 hours, while the temperature is decreased to 295 K. The reaction mass is filtered and the filter residue is washed with 45 ml of isopropanol and dried in vacuum to obtain 17.6 g of the compound of formula (20)

EXAMPLE A2

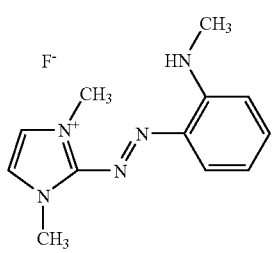

(22)

Under nitrogen atmosphere, at 293 K, to a stirred mixture of 10.0 ml of a 40% methylamine solution, 100 g isopropanol, the compound of formula (21) is added. Then, the temperature is raised to 333 K. The reaction mixture is stirred 8 hour at this temperature under the autoclave pressure. Then, the reaction mass is stirred for 4 hours, while the temperature is decreased to 295 K. The reaction mass is filtered and the filter residue is washed with 45 ml of isopropanol and dried in vacuum to obtain 18.6 g of product with the given formula (22).

EXAMPLE A3

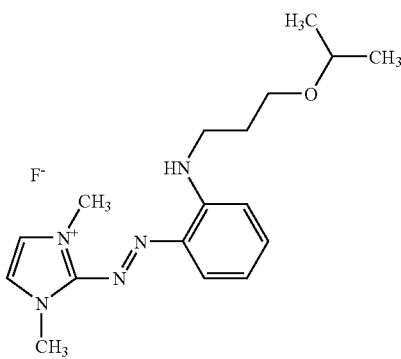

(23)

10 g triethylamine is added under nitrogen atmosphere, at 293 K, to a stirred mixture of 8 g 3-isopropoxy-1-propylamine, 100 g water and 27 g of compound of formula (21). Then, the temperature is raised to 333 K. The reaction mixture is stirred 3 hour at this temperature at normal pressure. Then, the reaction mass is stirred for 4 hours, while the temperature is decreased to 295 K. The reaction mass is filtered and the filter residue is washed with 45 ml of acetonitrile and dried in vacuum to obtain 30.5 g of product with the given formula (23).

EXAMPLE A4

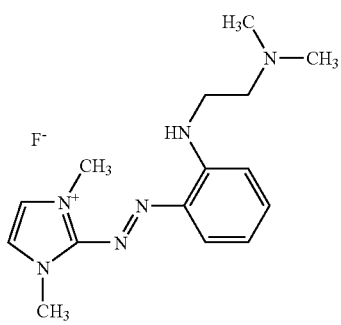

(24)

Under nitrogen atmosphere, at 293 K, to a stirred mixture of 1.8 g N,N-dimethylamino-ethylamin, 40 g acetonitrile, 6.6 g of compound of formula (21) is added. Then, the temperature is raised to 333 K. The reaction mixture is stirred 3 hour at this temperature under normal pressure. Then, the reaction mass is stirred for 4 hours, while the temperature is decreased to 295 K. The reaction mass is filtered and the filter residue is washed with 15 ml of acetonitrile and dried in vacuum to obtain 9.0 g of product with formula (24).

EXAMPLE A5

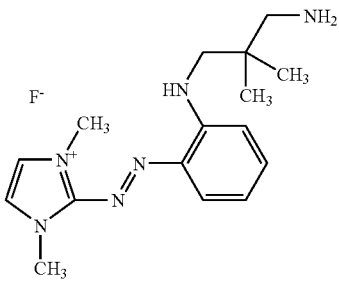

(25)

Under nitrogen atmosphere, at 293 K, to a stirred mixture of 3.06 g 2,2-dimethyl-1,3-diamino-propane and 40 g water 11.3 g of compound of formula (21) is added. Then, the temperature is raised to 333 K. The reaction mixture is stirred 6 hour at this temperature under nitrogen and normal pressure. Then, the reaction mass is stirred for 4 hours, while the temperature is; decreased to 295 K. The reaction mass is filtered and the filter residue is washed with 30 ml of water/sodiumchloride solution and dried in vacuum to obtain 12 g of product with formula (25).

EXAMPLE A6

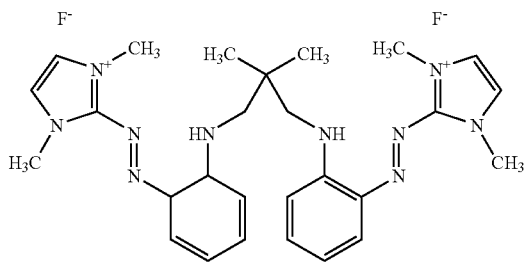

(26)

4 g triethylamine is added under nitrogen atmosphere, at 293 K, to a stirred mixture of 2.04 g 2,2-dimethyl-1,3-diamino-propane, 100 g isopropanol, and 14.3 g of the compound of formula (21). Then, the temperature is raised to 333 K. The reaction mixture is stirred 6 hour at this temperature under nitrogen and normal pressure. Then, the reaction mass is stirred for 4 hours, while the temperature is decreased to 295 K The reaction mass is filtered and the filter residue is washed with 30 ml of Isopropanol and dried in vacuum to obtain 12 g of product of formula (26).

EXAMPLE A7

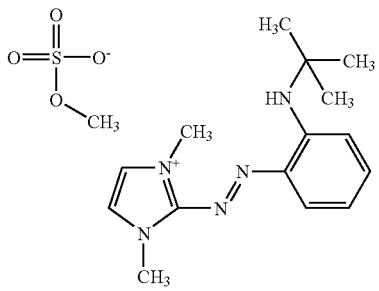

(27)

4 g triethylamine is added under nitrogen atmosphere, at 293 K, to a stirred mixture of 2.3 g 1,6-diamino-hexane, 100 g isopropanol, and 14.3 g of the compound of formula (21). Then, the temperature is raised to 343 K. The reaction mixture is stirred 16 hour at this temperature under nitrogen and normal pressure. Then, the reaction mass is stirred for 4 hours, while the temperature is decreased to 295 K. The reaction mass is filtered and the filter residue is washed with 30 ml of isopropanol and dried in vacuum to obtain 10.6 g of product with the given formula (27).

EXAMPLE A8

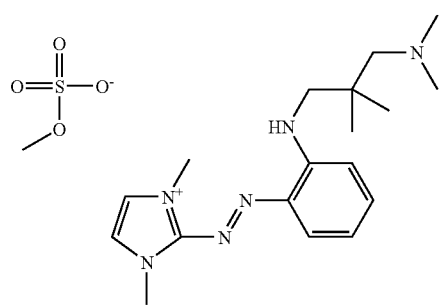

(28)

Under nitrogen atmosphere, at 293 K, add to a stirred mixture of 5.2 g 2,2,N,N-tetramethyl-1,3-diamino-propane, 100 g acetonitrile, and 14.3 g of the compound of formula (21). Then, the temperature is raised to 333 K. The reaction mixture is stirred 3 hour at this temperature under nitrogen and normal pressure. Then, the reaction mass is stirred for 4 hours, while the temperature is decreased to 295 K. The reaction mass is filtered and the filter residue is washed with 30 ml of acetonitrile and dried in vacuum to obtain 10.6 g of product of formula (28).

EXAMPLE A9

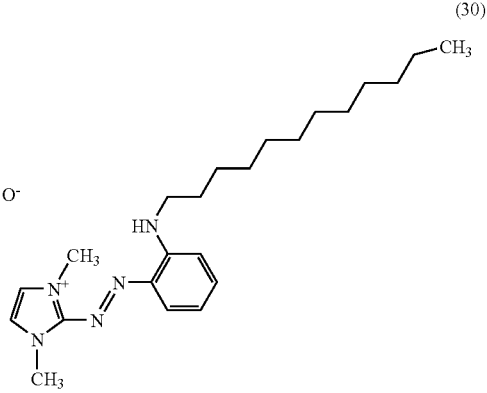

(29)

4 g triethylamine is added under nitrogen atmosphere, at 293 K, to a stirred mixture of 2.3 g tert-butylamine, 40 g acetonitrile, and 14.3 g of the educt of compound of formula (21). Then, the temperature is raised to 333 K. The reaction mixture is stirred 16 hour at this temperature under nitrogen and normal pressure. Then, the reaction mass is stirred for 4 hours, while the temperature is decreased to 295 K. The reaction mass is filtered and the filter residue is washed with 15 ml of acetonitrile and dried in vacuum to obtain 10.6 g of product of formula (29).

EXAMPLE A10

(30)

1 g sodium methoxide is added under nitrogen atmosphere, at 293 K, to a stirred mixture of of 7.3 g dodecylamine, 100 g acetonitrile, and 14.3 g of the compound of formula (21). Then, the temperature is raised to 333 K. The reaction mixture is stirred 8 hour at this temperature under normal pressure. Then, he reaction mass is stirred for 4 hours, while the temperature is decreased to 295 K. The reaction mass is filtered and the filter residue is washed with 45 ml of acetonitrile and dried in vacuum to obtain 15.6 g of product with the given formula (30).

EXAMPLE A11

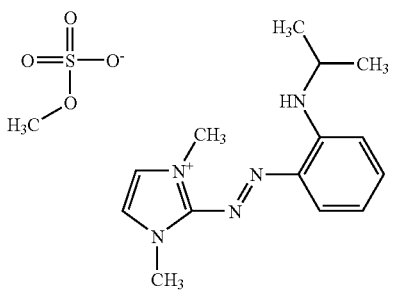

(31)

Under nitrogen atmosphere, at 293 K, to a stirred mixture of 4.3 g isopropylamine, 40 g water, and 14.3 g of the compound of formula (21) is added. The reaction mixture is stirred 8 hour at this temperature under normal pressure. The reaction mass is filtered and the filter residue is washed with 45 ml of acetonitrile and dried in vacuum to obtain 10.6 g of product of formula (31).

EXAMPLE A12

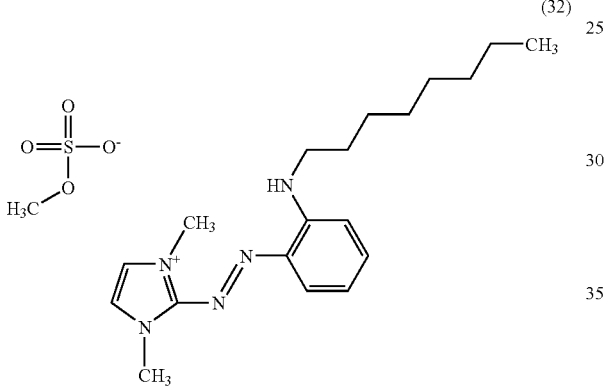

(32)

1 g sodium methoxide is added under nitrogen atmosphere, at 293 K, to a stirred mixture of 6 g 1-octylamine, 100 g isopropanol, to the 14 g of the compound of formula (21). Then, the temperature is raised to 333 K. The reaction mixture is stirred 8 hour at this temperature under normal pressure. Then, he reaction mass is stirred for 4 hours, while the temperature is decreased to 295 K. The reaction mass is filtered and the filter residue is washed with 45 ml of isopropanol and dried in vacuum to obtain 14.8 g of product with the given formula (32).

EXAMPLE A13

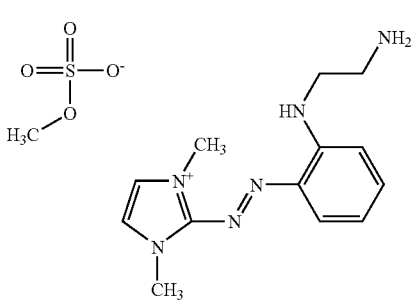

(33)

Under nitrogen atmosphere, at 293 K, to a stirred mixture of 3.8 g ethylendiamin, 40 g acetonitrile, 14 g of compound of formula (21) is added. Then, the temperature is raised to 333 K. The reaction mixture is stirred 3 hour at this temperature under normal pressure. Then, the reaction mass is stirred for 4 hours, while the temperature is decreased to 295 K. The reaction mass is filtered and the filter residue is washed with 15 ml of acetonitrile and dried in vacuum to obtain 9.0 g of product with the given formula (33).

EXAMPLE A14

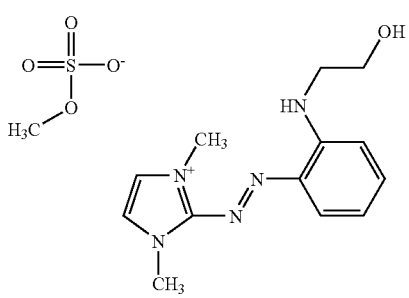

(34)

Under nitrogen atmosphere, at 293 K, to a stirred mixture of 4 g triethylamine, 2.0 g ethanolamin, 40 g acetonitrile, 14 g of the compound of formula (21) is added. Then, the temperature is raised to 333 K. The reaction mixture is stirred 5 hour at this temperature under normal pressure. Then, the reaction mass is stirred for 4 hours, while the temperature is decreased to 295 K. The reaction mass is filtered and the filter residue is washed with 15 ml of acetonitrile and dried in vacuum to obtain 9.0 g of product with the given formula (34).

EXAMPLE A15

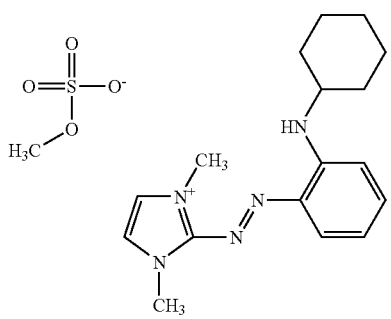

(35)

Under nitrogen atmosphere, at 293 K, to a stirred mixture of 4 g triethylamine, 3.8 g cyclohexylamin, 40 g acetonitrile, 14 g of the compound of formula (21) is added. Then, the temperature is raised to 333 K. The reaction mixture is stirred 8 hour at this temperature under normal pressure. Then, the reaction mass is stirred for 4 hours, while the temperature is decreased to 295 K. The reaction mass is filtered and the filter residue is washed with 15 ml of acetonitrile and dried in vacuum to obtain 9.0 g of product with the given formula (35).

EXAMPLE B

Application

EXAMPLE B1

A strongly alkaline 10% solution of a non-ionic surfactant (Plantaren 2000, Henkel) is adjusted to pH 9.5 using citric acid. 0.1% of the dye of formula (28) as given in example A8 is dissolved therein and a strand of human hair, bleached white, is treated with the dye solution at room temperature. After only a short period of time, the strand has been dyed a bluish-red shade, which is still very intensive even shampooing ten times. The dye also has a strong affinity to undamaged hair. In that case, too, the wash fastness is very good. The light fastness on damaged and undamaged hair is excellent. The perm fastness is on un- and damaged hair very good as well.

EXAMPLE B2

A 10% solution of a non-ionic surfactant (Plantaren 2000, Henkel) is adjusted to pH 5.5 using citric acid. 0.1% of the dye of formula (30) as given in example A10 is dissolved therein and a strand of middle blonde undamaged human hair is treated with the dye solution at room temperature. After only a short period of time, the strand has been dyed in a bluish shade, which has a good wash, perm and light fastness.

EXAMPLE B3

A dye emulsion, containing
0.1% of the dye according to the invention of formula (26) as given in example A6, and
3.5% cetearyi alcohol
1.0% ceteareth 80
0.5% giyceryi mono-di-stearate
3.0% stearamide DEA
1.0% stearamphopropyl sulfonate
0.5% polyquartemium-6 and
water ad 100%
is applied for 30 minutes, at room temperature, to bleached human hair, and rinsed. The result is a very attractive vibrant red dyeing with good fastnesses.

EXAMPLE B4

A dye emulsion, containing 1% of the dye of formula (20) as given in example 1, pH=9.8

| | |
|---|---|
| Cetylstearylalcohol | 11.00 |
| Oleth-5 | 5.0 |
| Oleic acid | 2.5 |
| Stearic acid monoethanolamide | 2.5 |
| Coco fatty acid monoethanolamide | 2.5 |
| Sodium laurylsuphate | 1.7 |
| 1,2-Propanediol | 1.0 |
| Ammoniumchloride | 0.5 |
| EDTA, Tetrasodiumsalt | 0.2 |
| Perfume | 0.4 |
| Cornproteinhydrolysate | 0.2 |
| Silica | 0.1 | is mixed with the same weight of 6% hydrogen peroxide solution and the mixture is immediately applied to a tress of brown hair. After 30 minutes the tress is rinsed, shampooed, rinsed and dried.

The color result is a very brilliant red shade.

EXAMPLE B5

A dye emulsion, containing 0.5% of the dye of formula (20) as given in example 1, pH=9.8

| | |
|---|---|
| Cetylstearylalcohol | 11.00 |
| Oleth-5 | 5.0 |
| Oleic acid | 2.5 |
| Stearic acid monoethanolamide | 2.5 |
| Coco fatty acid monoethanolamide | 2.5 |
| Sodium laurylsuphate | 1.7 |
| Sodiumsulphite | 1.0 |
| Ascorbic acid | 0.5 |
| 1,2-Propanediol | 1.0 |
| Ammoniumchloride | 0.5 |
| EDTA, Tetrasodiumsalt | 0.2 |
| Perfume | 0.4 |
| Cornproteinhydrolysate | 0.2 |
| Silica | 0.1 |
| Toluene-2,5-Diamine Sulfate | 0.07 |
| Resorcinol | 0.02 |
| 2-Amino-6-Chloro-4-Nitrophenol | 0.01 |
| 4-Amino-m-Cresol | 0.03 |
| 2-Amino-3-Hydroxypyridine | 0.001 | is mixed with the same weight of 6% hydrogen peroxide solution and the mixture is immediately applied to a tress of brown hair. After 30 minutes the tress 18 rinsed, shampooed, rinsed and dried.

The color result is a very brilliant violett shade.

The advantage of the dyes of example 1, 2 and 3 is the stability against reduction agents e.g. sodium sulfite and ascorbic acid. Therefore you can combine them with oxidation dyes in one emulsion.

EXAMPLE B6

A strongly alkaline 10% solution of a non-Ionic surfactant (Plantaren 2000, Henkel) is adjusted to pH 9.5 using citric acid. 0.1% of the dye of formula (20) as given in example 1 and 0.1% of the dye formula

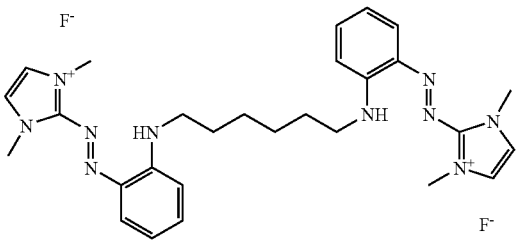

are dissolved therein and a strand of middle blonde undamaged human hair is treated with the dye solution at room temperature. After only 10 minutes, the strand has been dyed a intensive violett shade, which has a good wash, perm and light fastness.

EXAMPLE B7

A strongly alkaline 10% solution of a non-ionic surfactant (Plantaren 2000, Henkel) is adjusted to pH 9.5 using citric acid. 0.1% of the dye of example 1 and 0.1% of the dye formula (25) as given in example A5 are dissolved therein and a strand of dark blonde undamaged human hair is treated with the dye solution at room temperature. After 20 minutes, the strand has been dyed a intensive aubergine shade, which has a good wash, perm and light fastness.

EXAMPLE B8

First Step

A strand bleached blond heir is treated with a composition comprising 5 g of 6% by weight hydrogenperoxide solution and 5 g a composition comprising an oxidation base with a pH value of 9.8 as given below:

Composition comprising an oxidation base with a pH value of 9.8

| 10.0% by weight olic acid | |
|---|---|
| toluene-2,5-diamine sulfate | 0.07 |
| resorcinol | 0.02 |
| 2-amino-6-chloro-4-nitrophenol | 0.01 |
| 4-amino-m-cresol | 0.03 |
| 2-amino-3-hydroxypyridine | 0.001 |
| sodium sulfite | 1.0 |
| ascorbinic acid | 0.5 |
| water | ad 100 |

EXAMPLE B8a

Second Step

After 15 minutes, the pH of the hair is adjusted to pH 5 by addition of citric acid. Then, 5 g of a 12.5% citric acid gel, comprising the 0.1% by weight of dye of formula (20) of example 1 according to the present application, is applied on the hair and combed, so that the hair has a pH of 7. After 15 minutes the hair is washed with water, rinsed and dried. The strand has been dyed in an intensive shade, which has a good wash and light fastness.

EXAMPLE B8a

Second Step

After 15 minutes, without rinsing, blond hair is treated with a composition comprising 5 g of 6% by weight hydrogenperoxide solution and 5 g a composition comprising an oxidation base with a pH value of 5 as given below:

Composition comprising an oxidation base with a pH value of 5 (adjusted with citric acid)

| 10.0% by weight olic acid | |
|---|---|
| toluene-2,5-diamine sulfate | 0.07 |
| resorcinol | 0.02 |
| 2-amino-6-chloro-4-nitrophenol | 0.01 |
| 4-amino-m-cresol | 0.03 |
| 2-amino-3-hydroxypyridine | 0.001 |
| sodium sulfite | 1.0 |
| ascorbinic acid | 0.5 |
| water | ad 100 | and 5 g of a 12.5% citric acid gel, comprising the 0.1% by weight of dye of formula (23) of example A3 according to the present application, The hair is combed, so that the hair has a pH of 7. After 15 minutes the hair is washed with water, rinsed and dried. The strand has been dyed in an intensive shade, which has a good wash and light fastness.

EXAMPLE B8c

Second Step

After 15 minutes the hair is treated with 5 g composition comprising an oxidation base with a pH value of 9.8 as given below:

Composition comprising an oxidation base with a pH value of 9.8

| 10.0% by weight olic acid | |
|---|---|
| toluene-2,5-diamine sulfate | 0.07 |
| resorcinol | 0.02 |
| 2-amino-6-chloro-4-nitrophenol | 0.01 |
| 4-amino-m-cresol | 0.03 |
| 2-amino-3-hydroxypyridine | 0.001 |
| sodium sulfite | 1.0 |
| ascorbinic acid | 0.5 |
| water | ad 100 |

EXAMPLE B8a

Second Step

After 15 minutes, the pH of the hair is adjusted to pH 5 by addition of citric acid. Then, 5 g of a 12.5% citric acid gel, comprising the 0.1% by weight of dye of formula (20) of example 1 according to the present application, is applied on the hair and combed, so that the hair has a pH of 7. After 15 minutes the hair is washed with water, rinsed and dried. The strand has been dyed in an intensive shade, which has a good wash and light fastness.

EXAMPLE B8a

Second Step

After 15 minutes, without rinsing, blond hair is treated by a comb with a composition comprising 5 g of 6% by weight hydrogenperoxide solution and 5 g of a composition comprising an oxidation base with a pH value of 9.8 as given below:

Composition comprising an oxidation base with a pH value of 9.8

| 10.0% by weight olic acid | |
|---|---|
| toluene-2,5-diamine sulfate | 0.07 |
| resorcinol | 0.02 |
| 2-amino-6-chloro-4-nitrophenol | 0.01 |
| 4-amino-m-cresol | 0.03 |
| 2-amino-3-hydroxypyridine | 0.001 |
| sodium sulfite | 1.0 |
| ascorbinic acid | 0.5 |
| water | ad 100 | and a solution comprising 1% by weight of a dye of formula (23) according to example A3 of the present application with a pH of 9.8. After 15 minutes the hair is washed with water, rinsed and dried. The strand has been dyed in an intensive shade, which has a good wash and light fastness.

What is claimed is:

1. Cationic dye of formula (1)

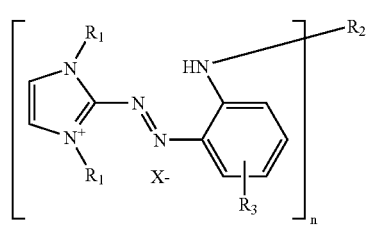

wherein $R_1$ is an unsubstituted or substituted $C_1$-$C_{14}$alkyl or an aryl radical;

$X^-$ is an anion;

$R_3$ is an unsubstituted or substituted $C_1$-$C_{14}$alkyl, aryl radical, $C_1$-$C_6$alkoxy, cyanide, nitro or halide;

n is 1 or 2; and if n is 1, then $R_2$ is hydrogen, unsubstituted or substituted $C_1$-$C_{14}$alkyl; or if n is 2, then $R_2$ is an unsubstituted or substituted $C_1$-$C_{14}$alkylene.

2. Cationic dye according to claim 1, wherein $R_1$ is methyl.

3. Cationic dye according to claim 1, wherein $R_1$ is methyl, n is 2, and $R_2$ is a substituted or unsubstituted $C_1$-$C_8$alkylene.

4. Cationic dye according to claim 1, wherein $R_1$ is methyl, n is 1, and $R_2$ is a substituted or unsubstituted $C_1$-$C_{12}$alkyl.

5. A process for the preparation of cationic dyes of formula (1) as defined in claim 1, comprising bringing a compound of formula (18)

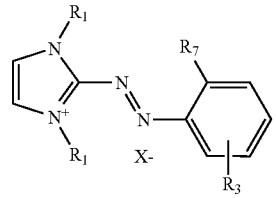

wherein $R_7$ is $C_1$-$C_6$alkoxy or halide, $R_1$ is an unsubstituted or substituted $C_1$-$C_{14}$alkyl or an aryl radical;

$X^-$ is an anion;

$R_3$ is an unsubstituted or substituted $C_1$-$C_{14}$alkyl, aryl radical, $C_1$-$C_6$alkoxy, cyanide, nitro or halide;

into contact with an amine of formula (19)

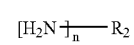

wherein n is 1 or 2; and if n is 1, then $R_2$ is hydrogen, unsubstituted or substituted $C_1$-$C_{14}$alkyl; or if n is 2, then $R_2$ is an unsubstituted or substituted $C_1$-$C_{14}$alkylene.

6. A composition comprising at least a single dye of formula (1) as defined in claim 1 and an adjuvant.

7. A composition according to claim 6, comprising in addition at least a single further direct dye and/or an oxidative agent.

8. A composition according to claim 6, comprising in addition at least a single oxidative dye and/or; at least a single oxidative dye and an oxidative agent.

9. A composition according to claim 6, in the form of a shampoo, conditioner, gel or emulsion.

10. A method of dyeing organic material, that comprises bringing into contact with the organic material at least a single dye of formula (1) according to claim 1, and, optionally, a further dye.

11. A method according to claim 10, which comprises dyeing or tinting human hair.

12. A method for dyeing human hair or strands, that comprises contacting the hair or strands with at least a single dye of formula (1) as defined in claim 1, and an oxidative agent and, optionally, a further direct dye.

13. A method for dyeing human hair, that comprises contacting the hair with at least a single cationic dye of formula (1) as defined in claim 1, and at least a single oxidative dye; or contacting the hair with a cationic dye of formula (1) as defined in claim 1, and at least a single oxidative dye and an oxidative agent.

14. A method for dyeing human hair, that comprises contacting the hair with a compound of formula (18) or formula (21), and at least a single oxidative dye; or contacting the hair with a compound of formula (18) or formula (21), and at least a single oxidative dye and an oxidative agent,

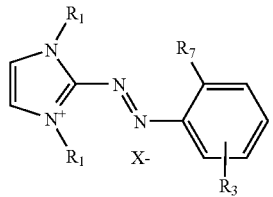
(18)

wherein
$R_7$ is $C_1$-$C_6$alkoxy or halide, and $X^-$ is an anion, $R_3$ is an unsubstituted or substituted $C_1$-$C_{14}$alkyl, aryl radical, $C_1$-$C_6$alkoxy, cyanid cyanide, nitro or halide, and $R_1$ is an unsubstituted or substituted $C_1$-$C_{14}$alkyl or an aryl radical;

or the compound of formula (21)

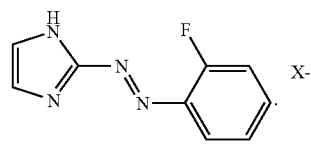
(21)

* * * * *